United States Patent
Peters et al.

(10) Patent No.: US 10,119,496 B2
(45) Date of Patent: Nov. 6, 2018

(54) CRYOGENIC FUEL INJECTION AND COMBUSTION

(71) Applicant: Cummins Inc., Columbus, IN (US)

(72) Inventors: Lester L. Peters, Columbus, IN (US); Paul Douglas Free, Hope, IN (US); John Robert Pendray, Blaine, MN (US)

(73) Assignee: CUMMINS INC., Columbus, IN (US)

( * ) Notice: Subject to any disclaimer, the term of this patent is extended or adjusted under 35 U.S.C. 154(b) by 76 days.

(21) Appl. No.: 14/686,764

(22) Filed: Apr. 14, 2015

(65) Prior Publication Data

US 2015/0292441 A1 Oct. 15, 2015

Related U.S. Application Data

(60) Provisional application No. 61/979,759, filed on Apr. 15, 2014.

(51) Int. Cl.
| | |
|---|---|
| *F02M 21/02* | (2006.01) |
| *F02D 41/40* | (2006.01) |
| *F02D 41/34* | (2006.01) |
| *F02D 19/06* | (2006.01) |

(52) U.S. Cl.
CPC ....... *F02M 21/0278* (2013.01); *F02D 41/345* (2013.01); *F02D 41/401* (2013.01); *F02M 21/029* (2013.01); *F02D 19/0644* (2013.01); *F02D 19/0647* (2013.01); *F02D 19/0689* (2013.01); *F02M 21/0206* (2013.01); *F02M 21/0209* (2013.01); *F02M 21/0212* (2013.01); *F02M 21/0218* (2013.01); *F02M 21/0221* (2013.01); *F02M 21/0275* (2013.01); *Y02T 10/32* (2013.01)

(58) Field of Classification Search
CPC .. F02D 19/0644; F02D 19/0647; F02D 19/10; F02D 41/0025; F02D 41/0027; F02D 41/345; F02M 21/0206; F02M 21/0209; F02M 21/0212; F02M 21/0221; F02M 21/0248; F02M 21/0278
See application file for complete search history.

(56) References Cited

U.S. PATENT DOCUMENTS 2,672,852 A * 3/1954 Miller ................. F02B 3/00
123/262
4,062,184 A 12/1977 Hagen
(Continued)

FOREIGN PATENT DOCUMENTS

| DE | 3617255 | 11/1987 |
|---|---|---|
| DE | 10060786 | 6/2002 |
| EP | 1213463 | 6/2002 |

*Primary Examiner* — Sizo Vilakazi
*Assistant Examiner* — Kevin R Steckbauer
(74) *Attorney, Agent, or Firm* — Faegre Baker Daniels LLP

(57) ABSTRACT

A combustion engine and a method of operating the combustion engine are disclosed. The method comprises supplying a charge gas to the combustion chamber through an intake port; discharging a cryogenic fuel in a liquid state from a fuel injector in fluid communication with the combustion chamber; closing an intake valve to close the combustion chamber; and actuating a piston during a compression cycle to compress the charge gas and the cryogenic fuel. At least a portion of the cryogenic fuel evaporates in the closed combustion chamber.

15 Claims, 7 Drawing Sheets

(56) References Cited

U.S. PATENT DOCUMENTS

| | | | |
|---|---|---|---|
| 4,508,064 A * | 4/1985 | Watanabe | F01K 21/02 123/1 A |
| 4,893,471 A | 1/1990 | Huling | |
| 4,930,309 A | 6/1990 | Hartman | |
| 4,953,789 A | 9/1990 | Strobl et al. | |
| 5,027,778 A * | 7/1991 | Nogi | F02D 43/00 123/472 |
| 5,033,444 A | 7/1991 | Kaufman et al. | |
| 5,150,691 A * | 9/1992 | Imajo | F02F 1/4214 123/308 |
| 5,284,117 A * | 2/1994 | Akase | F02D 41/3094 123/445 |
| 5,291,869 A | 3/1994 | Bennett | |
| 5,375,580 A | 12/1994 | Stolz et al. | |
| 5,441,234 A * | 8/1995 | White | B61C 5/00 251/144 |
| 5,450,829 A * | 9/1995 | Beck | F02D 19/0631 123/435 |
| 5,566,712 A * | 10/1996 | White | B61C 5/00 137/587 |
| 5,829,408 A * | 11/1998 | Yamaguchi | F02B 17/00 123/308 |
| 5,887,567 A * | 3/1999 | White | B61C 5/00 123/294 |
| 5,887,574 A | 3/1999 | Smith | |
| 6,148,792 A * | 11/2000 | Hei Ma | F02B 23/105 123/298 |
| 6,196,204 B1 * | 3/2001 | Janach | F02B 43/04 123/527 |
| 6,202,601 B1 * | 3/2001 | Ouellette | F02B 1/12 123/27 GE |
| 6,561,157 B2 * | 5/2003 | zur Loye | F02B 1/04 123/295 |
| 6,598,584 B2 * | 7/2003 | Beck | F02B 1/12 123/299 |
| 6,609,499 B2 * | 8/2003 | Kabat | F02B 43/00 123/432 |
| 6,659,054 B2 * | 12/2003 | Sugiyama | F01L 1/022 123/478 |
| 6,722,344 B2 * | 4/2004 | Ashida | F02B 17/00 123/308 |
| 6,742,495 B2 * | 6/2004 | Ashida | F02B 31/04 123/310 |
| 6,854,448 B2 * | 2/2005 | Okamoto | F02M 51/0678 123/298 |
| 6,863,046 B2 * | 3/2005 | Laimbock | F02B 31/085 123/302 |
| 6,990,968 B2 * | 1/2006 | Nagaishi | F02D 41/047 123/480 |
| 7,013,875 B2 * | 3/2006 | Saruwatari | F01L 1/3442 123/478 |
| 7,069,909 B2 * | 7/2006 | Pozar | F02D 41/0002 123/478 |
| 7,278,396 B2 * | 10/2007 | Leone | F01N 11/00 123/431 |
| 7,302,934 B2 * | 12/2007 | Ishii | F02B 61/02 123/188.14 |
| 7,484,495 B2 * | 2/2009 | Kamio | F02B 47/02 123/304 |
| 7,628,137 B1 | 12/2009 | McAlister | |
| 7,913,665 B2 * | 3/2011 | Oomura | F02M 61/1853 123/308 |
| 7,921,833 B2 * | 4/2011 | Bidner | F02D 41/0025 123/1 A |
| 8,020,532 B2 * | 9/2011 | Bidner | F02D 41/0025 123/1 A |
| 8,166,952 B2 * | 5/2012 | Bidner | F02D 41/0025 123/1 A |
| 8,219,302 B2 * | 7/2012 | Yamashita | F02D 41/2438 701/106 |
| 8,281,766 B2 * | 10/2012 | Tomiita | F02M 35/10177 123/432 |
| 8,297,257 B2 * | 10/2012 | Sugiyama | F02M 55/005 123/456 |
| 8,555,852 B2 * | 10/2013 | Munshi | F02B 43/10 123/27 GE |
| 8,725,390 B1 * | 5/2014 | Snyder | F02D 41/345 123/435 |
| 8,899,212 B2 * | 12/2014 | Leone | F02D 41/062 123/442 |
| 8,967,115 B2 * | 3/2015 | Gentile | F02M 69/042 123/298 |
| 9,145,838 B2 * | 9/2015 | Finn | F02D 19/0647 |
| 9,175,640 B2 * | 11/2015 | Ryan | F02M 21/0212 |
| 9,284,928 B2 * | 3/2016 | Caley | F02M 21/0287 |
| 9,309,845 B2 * | 4/2016 | Gutscher | F02D 41/0025 |
| 9,435,288 B2 * | 9/2016 | Cohn | F02D 41/3094 |
| 9,512,797 B2 * | 12/2016 | Leone | F02D 41/062 |
| 9,631,548 B2 * | 4/2017 | Weber | F02B 17/005 |
| 9,631,572 B2 * | 4/2017 | Glugla | F02D 35/028 |
| 9,695,759 B2 * | 7/2017 | Windbergs | F02D 19/0692 |
| 9,726,106 B2 * | 8/2017 | Surnilla | F02D 41/345 |
| 9,845,776 B2 * | 12/2017 | Gutscher | F02M 21/0278 |
| 9,915,219 B2 * | 3/2018 | Berkemeier | F02D 41/3094 |
| 9,976,496 B2 * | 5/2018 | Cohn | F02D 41/3094 |
| 2002/0007816 A1 * | 1/2002 | Zur Loye | F02B 1/04 123/295 |
| 2002/0050266 A1 * | 5/2002 | Okamoto | F02M 51/0678 123/298 |
| 2003/0024246 A1 * | 2/2003 | Beck | F02B 1/12 60/599 |
| 2003/0084877 A1 * | 5/2003 | Kabat | F02B 43/00 123/432 |
| 2003/0159668 A1 * | 8/2003 | Sugiyama | F01L 1/022 123/90.16 |
| 2003/0196636 A1 * | 10/2003 | Ashida | F02B 31/04 123/310 |
| 2003/0196641 A1 * | 10/2003 | Ashida | F02B 17/00 123/432 |
| 2004/0134467 A1 * | 7/2004 | Saruwatari | F01L 1/3442 123/458 |
| 2004/0164187 A1 * | 8/2004 | Kihara | F02M 61/1806 239/552 |
| 2005/0051147 A1 * | 3/2005 | Nagaishi | F02D 41/047 123/676 |
| 2006/0037306 A1 * | 2/2006 | Pozar | F02D 41/0002 60/285 |
| 2007/0163537 A1 * | 7/2007 | Kamio | F02B 47/02 123/304 |
| 2007/0175688 A1 * | 8/2007 | Ishii | F02B 61/02 180/219 |
| 2009/0084339 A1 * | 4/2009 | Oomura | F02M 61/145 123/193.2 |
| 2009/0151698 A1 * | 6/2009 | Ellgas | F02M 21/06 123/445 |
| 2009/0241904 A1 * | 10/2009 | Sugiyama | F02M 55/005 123/468 |
| 2009/0241905 A1 * | 10/2009 | Tomiita | F02M 35/10177 123/470 |
| 2009/0299611 A1 * | 12/2009 | Yamashita | F02D 41/2438 701/106 |
| 2010/0115917 A1 | 5/2010 | Laine | |
| 2010/0236518 A1 * | 9/2010 | Bidner | F02D 41/0025 123/304 |
| 2010/0250100 A1 * | 9/2010 | Tomiita | F02M 35/10177 701/104 |
| 2011/0186014 A1 * | 8/2011 | Bidner | F02D 41/0025 123/445 |
| 2012/0004829 A1 * | 1/2012 | Bidner | F02D 41/0025 701/103 |
| 2012/0226426 A1 * | 9/2012 | Finn | F02D 19/0647 701/103 |
| 2012/0279472 A1 * | 11/2012 | Windbergs | F02D 19/0692 123/445 |
| 2013/0152903 A1 * | 6/2013 | Leone | F02D 41/062 123/491 |
| 2013/0179050 A1 * | 7/2013 | Munshi | F02B 43/10 701/104 |

(56) References Cited

U.S. PATENT DOCUMENTS

| | | | |
|---|---|---|---|
| 2013/0233274 A1* | 9/2013 | Caley | F02M 21/0287 123/294 |
| 2014/0000559 A1* | 1/2014 | Gutscher | F02M 21/0278 123/445 |
| 2014/0021272 A1* | 1/2014 | Ryan | F02M 21/0212 239/533.2 |
| 2014/0034015 A1* | 2/2014 | Gutscher | F02D 41/0025 123/445 |
| 2014/0102405 A1* | 4/2014 | Weber | F02B 17/005 123/295 |
| 2015/0083086 A1* | 3/2015 | Leone | F02D 41/062 123/491 |
| 2015/0285179 A1* | 10/2015 | Cohn | F02D 41/3094 701/104 |
| 2015/0345419 A1* | 12/2015 | Glugla | F02D 35/028 123/299 |
| 2016/0169145 A1* | 6/2016 | Surnilla | F02D 41/345 701/104 |
| 2016/0201593 A1* | 7/2016 | Berkemeier | F02D 41/3094 123/299 |
| 2016/0326971 A1* | 11/2016 | Cohn | F02D 41/3094 |

* cited by examiner

CRYOGENIC FUEL INJECTION AND COMBUSTION

CROSS-REFERENCE TO RELATED APPLICATIONS

This application claims the benefit of priority from U.S. Provisional Patent Application No. 61/979,759, filed on Apr. 15, 2014, entitled "CRYOGENIC FUEL INJECTION AND COMBUSTION," which is expressly incorporated by reference herein in its entirety.

TECHNICAL FIELD

The present invention relates generally to combustion engines, and more specifically to combustion engines and methods to fuel the combustion engine with a cryogenic fuel.

BACKGROUND

Exhaust emissions from internal combustion engines are significant contributors to pollution in the environment. In particular, nitrogen oxide and nitrogen dioxide (collectively, NOx) emissions contribute to smog and acid rain. NOx is a byproduct of the combustion of fossil fuels, and diesel engines are regarded as a major generator of NOx.

A natural gas fuel can provide improved emissions quality when compared to conventional fuels in combustion engine applications. Natural gas is available in the form of compressed natural gas (CNG) or liquid natural gas (LNG). However, the present use of natural gas in combustion engines is limited generally to CNG, which has certain disadvantages, such as carrying a risk for causing explosions. LNG, on the other hand, and cryogenic fuels more generally, requires careful handling and specialized components to prevent freezing due to the low temperatures at which the fuel is maintained.

Consequently, there is a continuing need for an improved combustion engine and a method to fuel the combustion engine with cryogenic fuels.

SUMMARY OF DISCLOSED EMBODIMENTS

Embodiments of the present invention provide a combustion engine and a method for combusting a cryogenic fuel. The combustion engine is designed to cause evaporation of the cryogenic fuel in a combustion chamber. In some embodiments, at least a portion of the cryogenic fuel evaporates during the compression cycle of the combustion engine. In variations thereof, the majority of the cryogenic fuel evaporates during the compression cycle after the intake valve is closed and while the piston is moving toward the intake valve. The phase transition of the cryogenic fuel in the combustion chamber reduces the pressure and temperature in the cylinder during compression, increasing the compression ratio of the combustion engine and/or reducing nitric oxide and nitrogen dioxide (NOx) emissions.

In one embodiment, the combustion engine comprises a block having a cylindrical bore; a valve header having an intake port structured to receive a charge gas and guide the charge gas to the combustion chamber; a piston structured to move axially within the cylindrical bore toward the valve header in a compression cycle of the combustion engine, the piston, the cylindrical bore, and the valve header forming a combustion chamber; a fuel injector structured to discharge the cryogenic fuel in a liquid state; and an intake valve fluidly connecting the intake port with the combustion chamber. Closing the intake valve closes the combustion chamber, whereby at least a portion of the cryogenic fuel evaporates in the closed combustion chamber during the compression cycle.

In one embodiment, the method comprises supplying a charge gas to the combustion chamber through an intake port; discharging a cryogenic fuel in a liquid state from a fuel injector in fluid communication with the combustion chamber; closing an intake valve to close the combustion chamber; and actuating a piston during a compression cycle to compress the charge gas and the cryogenic fuel. At least a portion of the cryogenic fuel evaporates in the closed combustion chamber.

While multiple embodiments are disclosed, still other embodiments of the present invention will become apparent to those skilled in the art from the following detailed description, which shows and describes illustrative embodiments of the invention. Accordingly, the drawings and detailed description are to be regarded as illustrative in nature and not restrictive.

BRIEF DESCRIPTION OF THE DRAWINGS

The above-mentioned and other disclosed features, the manner of attaining them, and the advantages thereof, will become more apparent and will be better understood by reference to the following description of disclosed embodiments taken in conjunction with the accompanying drawings, wherein.

Figure 1:
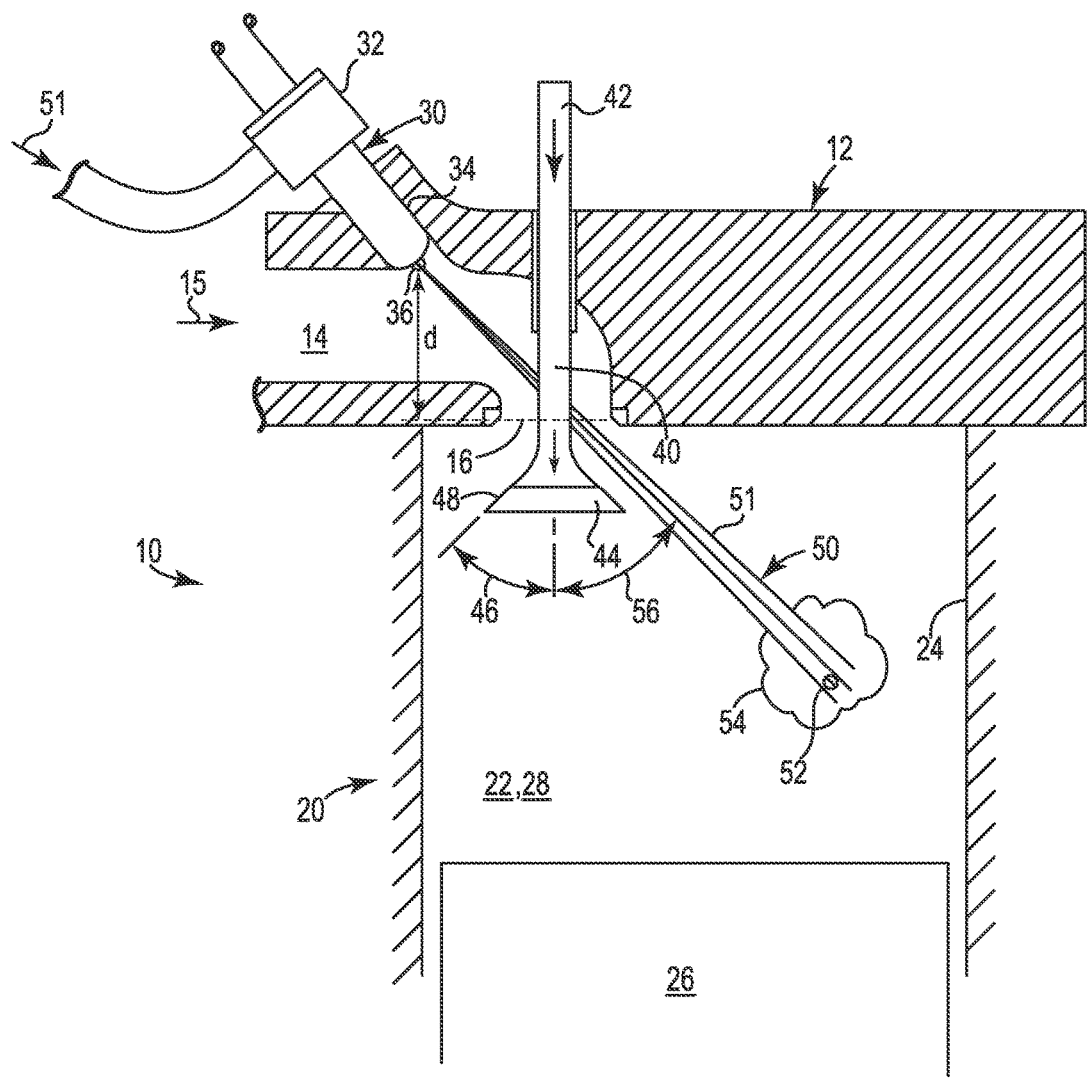
FIG. 1 is a sectional view of an embodiment of a combustion engine configured to inject a cryogenic fuel into a combustion chamber.

While the invention is amenable to various modifications and alternative forms, specific embodiments have been shown by way of example in the drawings and are described in detail below. The intention, however, is not to limit the invention to the particular embodiments described. On the contrary, the invention is intended to cover all modifications, equivalents, and alternatives falling within the scope of the invention as defined by the appended claims.

DETAILED DESCRIPTION OF DISCLOSED EMBODIMENTS

FIG. 1 is a sectional view of an embodiment of an engine 10. Engine 10 comprises a valve header 12 secured to a block 20. Valve header 12 comprises an intake port 14 configured to receive a charge gas 15 from a gas source (not shown) and guide passage of charge gas 15 through a valve throat 16 disposed on valve header 12. Block 20 comprises a cylindrical bore 22 having a cylindrical bore surface. Rotation of a crankshaft (not shown) moves a piston 26 longitudinally within cylindrical bore 22 to form a combustion chamber 28 of variable volume. The terms combustion chamber, cylindrical bore, and cylinder, may be used interchangeably when referring to the volume into which charge gas and cryogenic fuel are provided. A cylinder liner (not shown) may be inserted in cylindrical bore 22 to facilitate repairs. The surface of the cylinder liner, when used, or the bore when a liner is not used, is referred to herein as cylindrical chamber surface 24.

Engine 10 can be a four-cycle engine. A four-cycle engine includes intake, compression, power, and exhaust cycles. The crankshaft rotates through two complete revolutions to cause the pistons to move in an out of the cylinders twice. As is well known, during the intake cycle the piston begins at top dead center (TDC) and descends until it reaches bottom dead center (BDC), increasing the volume of the combustion chamber with the intake valve open and the exhaust valve closed, during which time the gas charge and cryogenic fuel are provided to the cylinder. During the compression cycle, the piston moves from BDC to TDC with both intake and exhaust valves closed, compressing the gas charge and cryogenic fuel mixture. At the end of the compression cycle and/or the beginning of the power cycle, while the piston is close to TDC, the compressed mixture is ignited. The resulting pressure from the combustion of the compressed mixture forces the piston back down toward BDC. As used herein, up/top means movement toward or position near the valve header and down/bottom means movement away or position distally away from the valve header.

Figure 2:
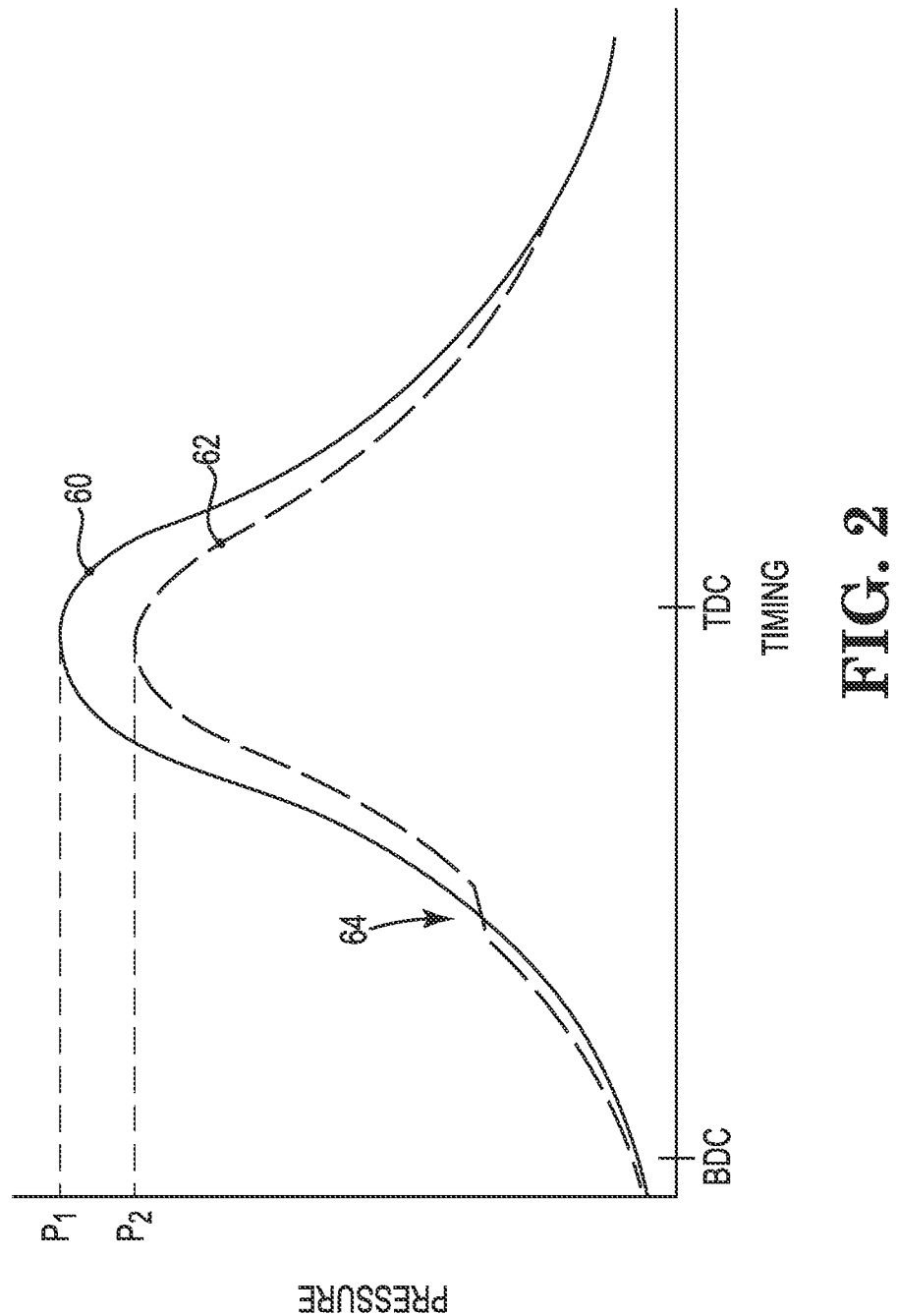
FIG. 2 is a graph depicting the pressure relationship of natural gas in compressed and liquid states to the position of a piston.
Figure 3:
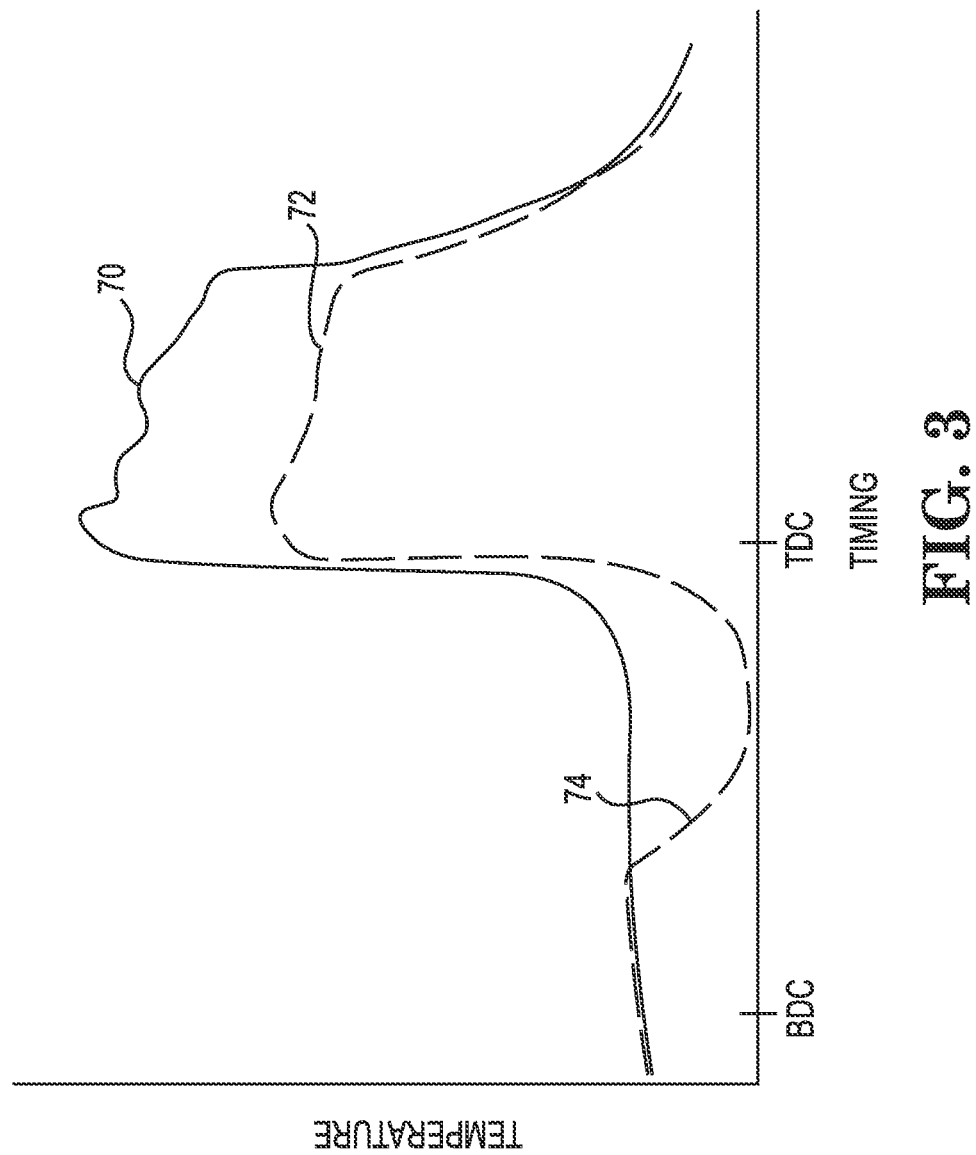
FIG. 3 is a graph depicting the temperature relationship of natural gas in compressed and liquid states to the position of the piston.

FIGS. 2 and 3 are graphs depicting the pressure and temperature relationships during the compression and power cycles to the position of a piston while combusting CNG and LNG. FIG. 2 depicts a line 60 representing cylinder pressure combusting CNG having a peak pressure P1, and a line 62 representing cylinder pressure combusting LNG having a peak pressure P2. A transition point 64 depicts the state change of LNG from liquid to gas. FIG. 3 depicts a line 70 representing cylinder temperature combusting CNG, and a line 72 representing cylinder temperature combusting LNG. These graphs illustrate that during the transition from liquid to gas, LNG removes heat from the combustion chamber, which lowers pressure. Consequently, it is advantageous to capture the transition of LNG from liquid to gas within the combustion chamber rather than gasifying the LNG and then injecting the gasified LNG into the combustion chamber.

Returning to FIG. 1, engine 10 further comprises an intake valve 40 having a valve stem 42 secured to a valve head 44. Valve head 44 is chamfered at an angle 46, referred to as the seat angle, to form a valve head seat 48, which mates with valve throat 16 to close intake valve 40. Valve throat 16 has a frustoconical surface having a minimum diameter, referred to herein as the valve throat diameter. In one variation, seat angle 46 of valve head 44 is between about 25 and 50 degrees. In another variation, seat angle 46 of valve head 44 is between about 30 and 45 degrees. The seat angle is selected based on a combination of desired injection characteristics and other engine design considerations.

In some embodiments, fuel injector 30 is disposed to spray at an oblique angle 56 relative to the longitudinal axis of valve stem 42. In a variation thereof, injection angle 56 is parallel to the seat angle. In some embodiments, fuel injector 30 discharges two or more spray plumes 50, each of which is parallel to the seat angle and all of which are radially and equally distributed around valve head 44. In a variation thereof, two spray plumes 50 are discharged at an angle of about 35 degrees and the seat angle is about 35 degrees.

Valve stem 42 moves axially between open and close positions in timed fashion with fuel injector 30 and piston 26 to mix charge gas 15 and a cryogenic fuel 51, and to cause cryogenic fuel 51 to evaporate within combustion chamber 28, thereby reducing the temperature of charge gas 15 and combustion chamber 28. Charge gas 15 cools via the latent heat of evaporation of cryogenic fuel 51, which occurs when cryogenic fuel 51 transitions from a liquid state to a gaseous state, and specific heat cooling of charge gas 15 during the compression cycle of engine 10, which depends on the specific heat capacity of cryogenic fuel 51. For example, the charge gas may be exposed to a cryogenic fuel in the form of a liquid natural gas at a temperature of about −150° C. As the cryogenic fuel equilibrates to a chamber ambient temperature determined by the temperatures of the charge gas and combustion chamber, the temperature of the cryogenic fuel increases and the temperatures of the charge gas and the combustion chamber decrease, which reduces cylinder or combustion chamber pressure during compression, thereby reducing NOx emissions, allowing increases in engine power, and/or increasing the thermal efficiency of engine 10.

Engine 10 further comprises a fuel injector 30 configured to deliver cryogenic fuel 51 to combustion chamber 28. Fuel injector 30 comprises a solenoid 32 coupled to a body 34, and a injector tip 36. Solenoid 32 is energized to operate a valve (not shown) within fuel injector 30. When the valve is open, cryogenic fuel 51 is discharged out of injector tip 36 and forms spray plume 50 comprised of a plurality of fuel droplets 52. The sizes of fuel droplets 52 are determined by the discharge pressure, and the configuration of injector tip 36. The inertia of fuel droplets 52 causes them to separate and form a mushroom cloud 54. The distance between injector tip 36 and the mushroom cloud may be referred to as the "spray distance", which is controlled by the discharge pressure, charge gas 15 density, and temperature, and the temperature of combustion chamber 28, which parameters may be referred to as the "spray distance control parameters". In embodiments of the invention, the spray distance control parameters are selected to substantially prevent contact between mushroom cloud 54 and chamber surface 24.

As used herein, a cryogenic fuel is any fuel that remains in a liquid state only at very low temperatures, e.g. at or below −150° C. Exemplary cryogenic fuels include liquid natural gas and liquid hydrogen. Exemplary charge gases include air and other gases commonly used as components of a charge gas, such as regenerated exhaust gas. A large thermal gradient between charge gas 15 and cryogenic fuel 51 can increase the rate of evaporation of cryogenic fuel 51 relative to a smaller thermal gradient, which in turn further increases the effectiveness of polytropic compression. For example, a liquid natural gas with a boiling point of −300° C. has a higher rate of evaporation when mixed with the charge gas in the combustion chamber than a fuel with a higher boiling point.

As shown in FIG. 1, injector tip 36 of fuel injector 30 protrudes into intake port 14. This configuration is referred to as indirect, or late port, injection, whereby cryogenic fuel 51 is discharged into intake port 14 and pressurized to flow therethrough into combustion chamber 28. Transit time of cryogenic fuel 51 between injector tip 36 of fuel injector 30 and valve throat 16 can cause premature mixing, heating, and evaporation of cryogenic fuel 51. In some embodiments, injector tip 36 is disposed within intake port 14 in close proximity to valve throat 16. Intake valve 40 blocks flow of cryogenic fuel 51 into combustion chamber 28 when closed. Cryogenic fuel 51 can be injected for a short duration while intake valve 40 is open. In a variation of the present embodiment, combustion is optimized by controlling the distance "d" between injector tip 36 and valve throat 16, measured perpendicularly to a plane parallel to and passing through the open area of valve throat 16, referred to herein as the "intake port injection distance". In some embodiments, the fuel injector is mounted on the valve header as close to the valve throat is possible to spray the cryogenic fuel into intake port 14 without substantially disturbing flow of charge 15 gas through intake port 14. In one example, the intake port injection distance is about between 0.5 and 3.0 valve throat diameters. In a further example, the intake port injection distance is less than about 2.0 valve throat diameters. In yet another example, the intake port injection distance is no more than about 1.0 valve throat diameters.

In other embodiments, fuel injector 30 is configured for direct injection and is mounted on valve header 12 with injector tip 36 protruding into combustion chamber 28 to inject cryogenic fuel 51 directly into combustion chamber 28. Thus, fuel injector 30 can be controlled to inject cryogenic fuel 51 into combustion chamber 28 regardless of the position of intake valve 40.

Closing intake valve 40 closes combustion chamber 28. At least a portion of cryogenic fuel 51 evaporates in the closed combustion chamber during the compression cycle. In one embodiment, the portion of cryogenic fuel 51 that evaporates in the closed combustion chamber 28 comprises at least 60% of cryogenic fuel 51 discharged by fuel injector 30, or a direct injection fuel injector, in a given cycle. In another embodiment, the portion of cryogenic fuel 51 that evaporates in the closed combustion chamber 28 comprises at least 80% of cryogenic fuel 51 discharged by fuel injector 30, or a direct injection fuel injector, in a given cycle.

In certain embodiments, engine 10, 210 (described below) includes a control system structured to perform certain operations. In certain embodiments, a controller forms a portion of a processing subsystem including one or more computing devices having memory, processing, and communication hardware. The controller may be a single device or a distributed device, and the functions of the controller may be performed by hardware and/or as computer instructions on a non-transient computer readable storage medium.

In certain embodiments, the controller includes one or more modules structured to functionally execute the operations of the controller. In certain embodiments, the controller may include a combustion definition module, a fueling target module, and/or a fueling control module. The description herein including modules emphasizes the structural independence of certain aspects of the controller, and illustrates one grouping of operations and responsibilities of the controller. Other groupings that execute similar overall operations are understood within the scope of the present application. Modules may be implemented in hardware and/or as computer instructions on a non-transient computer readable storage medium, and modules may be distributed across various hardware or computer based components. The various functions of the different components can be combined or segregated as hardware and/or software modules in any manner, and can be useful separately or in combination. Input/output or I/O devices or user interfaces including but not limited to keyboards, displays, pointing devices, and the like can be coupled to the system either directly or through intervening I/O controllers. Thus, the various aspects of the disclosure may be embodied in many different forms, and all such forms are contemplated to be within the scope of the disclosure.

Example and non-limiting module implementation elements include sensors providing any value determined herein, sensors providing any value that is a precursor to a value determined herein, datalink and/or network hardware including communication chips, oscillating crystals, communication links, cables, twisted pair wiring, coaxial wiring, shielded wiring, transmitters, receivers, and/or transceivers, logic circuits, hard-wired logic circuits, reconfigurable logic circuits in a particular non-transient state configured according to the module specification, any actuator including at least an electrical, hydraulic, or pneumatic actuator, a solenoid, an op-amp, analog control elements (springs, filters, integrators, adders, dividers, gain elements), and/or digital control elements.

One of skill in the art, having the benefit of the disclosures herein, will recognize that in certain embodiments of the present disclosure a controller may be structured to perform operations that improve various technologies and provide improvements in various technological fields. Without limitation, example and non-limiting technology improvements include improvements in combustion performance of internal combustion engines, improvements in emissions performance, aftertreatment system regeneration, engine torque generation and torque control, engine fuel economy performance, improved durability of exhaust system components for internal combustion engines, and engine noise and vibration control. Without limitation, example and non-limiting technological fields that are improved include the technological fields of internal combustion engines, fuel systems therefore, aftertreatment systems therefore, air handling devices therefore, and intake and exhaust devices therefore.

Certain operations described herein include operations to interpret and/or to determine one or more parameters. Interpreting or determining, as utilized herein, includes receiving values by any method known in the art, including at least receiving values from a datalink or network communication, receiving an electronic signal (e.g. a voltage, frequency, current, or PWM signal) indicative of the value, receiving a computer generated parameter indicative of the value, reading the value from a memory location on a non-transient computer readable storage medium, receiving the value as a run-time parameter by any means known in the art, and/or by receiving a value by which the interpreted parameter can be calculated, and/or by referencing a default value that is interpreted to be the parameter value.

Many aspects of the disclosure are described in terms of sequences of actions can be performed by elements of a computer system or other hardware capable of executing programmed instructions, for example, a general purpose computer, special purpose computer, workstation, or other programmable data processing apparatus. It will be recognized that in each of the embodiments, the various actions could be performed by specialized circuits (e.g., discrete logic gates interconnected to perform a specialized function), by program instructions (software), such as logical blocks, program modules, etc. being executed by one or more processors (e.g., one or more microprocessors, a central processing unit (CPU), and/or application specific integrated circuit), or by a combination of both. For example, embodiments can be implemented in hardware, software, firmware, middleware, microcode, or any combination thereof. The instructions can be program code or code segments that perform necessary tasks and can be stored in a non-transitory machine-readable medium such as a storage medium or other storage(s). A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents.

The non-transitory machine-readable medium can additionally be considered to be embodied within any tangible form of computer readable carrier, such as solid-state memory, magnetic disk, and optical disk containing an appropriate set of computer instructions, such as program modules, and data structures that would cause a processor to carry out the techniques described herein. A computer-readable medium may include the following: an electrical connection having one or more wires, magnetic disk storage, magnetic cassettes, magnetic tape or other magnetic storage devices, a portable computer diskette, a random access memory (RAM), a read-only memory (ROM), an erasable programmable read-only memory (e.g., EPROM, EEPROM, or Flash memory), or any other tangible medium capable of storing information.

In one embodiment, the controller comprises a fueling control module structured to actuate the fuel injector to discharge the cryogenic fuel after the intake valve reaches a full-open position during the intake cycle of the combustion engine. The intake valve opens and closes in relation to the position of the pistons. The controller therefore determines when the full-open position occurs based on the position of the crankshaft and the pistons. The controller can determine other degrees of valve opening in a similar manner, based on the design of the valve actuation mechanism (described below). In another embodiment, the controller comprises a fueling control module structured to actuate the fuel injector to discharge the cryogenic fuel while the intake valve is still closed immediately before or during the intake cycle. In a further embodiment, the controller comprises a fueling control module structured to actuate the fuel injector to discharge the cryogenic fuel after the intake valve becomes more than about 30% open. As used herein, percentage open indicates the amount of longitudinal movement of the intake valve stem, wherein the intake valve is 100% open at maximum extension and is 0% open when it is closed, at minimum extension.

In one embodiment, the controller comprises a timing module structured to determine the position of the crankshaft, which correlates to the position of the pistons in the cylinders. The timing module may be coupled to a position sensor and may include logic structured to process a signal from the sensor to generate a position signal indicative of said position. In one embodiment, the controller comprises an exhaust control module structured to determine the temperature of and NOx emissions in the exhaust gases. The exhaust control module may be coupled to an exhaust temperature sensor and a NOx sensor, and may include logic structured to output signals indicative of exhaust temperature and NOx emissions. The controller may be coupled to additional sensors and comprise additional modules structured to determine cylinder pressures and torque. The sensors and logic to determine crankshaft timing, exhaust temperature, NOx emissions, cylinder pressures, and torque, are well known in the art and will not be further described herein.

Engine 10, 210 also comprises an actuation mechanism (not shown) to actuate the intake valve. The actuation mechanism may comprise a camshaft operating a plurality of arms actuating a plurality of corresponding intake and exhaust valves, for example. Timing of the valves may be adjusted by adjusting the timing of the camshaft. Alternatively, individual electrical actuation mechanisms may actuate individual valves, or pairs of valves, based on a signal provided by the controller to the electrical actuation mechanism. A solenoid is a component of an exemplary electrical actuation mechanism.

Fuel injector 30 is optionally adapted to spray cryogenic fuel 51 into combustion chamber 28 with a targeted spray profile. In one embodiment, the controller is structured to actuate the fuel injector to change the open area of a discharge orifice in the tip of the fuel injector to change the discharge pressure, to generate the targeted spray profile. In another embodiment, the controller is structured to set the discharge timing of the fuel injector to generate the targeted spray profile. In some embodiments, the spray profile comprises at least a first spray plume 50 within the combustion chamber 28. Spray plume 50 comprises spray angle 56, a cone angle, and a spray length, described above. The cone angle characterizes the area of the plume perpendicular to the spray angle. In some embodiments, spray plume 50 is delivered to combustion chamber 28 with minimal impingement on chamber surface 24. Spray plume 50 includes a first plurality of fuel droplets. The plurality of fuel droplets may have an average droplet diameter that facilitates optimal evaporation of cryogenic fuel 51. In direct injection, it is desirable to minimize the average droplet diameter. In one embodiment, the droplets provided by direct fuel injection have average diameters between about 10 and 100 micrometers. In another embodiment, the droplets provided by direct fuel injection have average diameters between about 10 and 50 micrometers. In late port injection, it is desirable to generate droplets having average diameters sufficiently large to minimize evaporation and heat absorption outside the combustion chamber, e.g. premature warming, but sufficiently small to complete evaporation during the compression cycle. In one embodiment, the droplets provided by late port (or indirect) fuel injection have average diameters between about 30 and 300 micrometers. In another embodiment, the droplets provided by indirect fuel injection have average diameters between about 80 and 120 micrometers. Direct fuel injectors are built more robustly than indirect fuel injectors because they have to sustain large cylinder pressures. On the other hand, direct fuel injection does not depend on intake valve positions and therefore offers additional degrees of control freedom. In some embodiments, cryogenic fuel is injected directly while the intake valve is less than 30% open.

In some embodiments, fuel injector 30 is controlled to spray a second spray plume of cryogenic fuel 51 that includes a second plurality of fuel droplets. In some embodiments, the second spray plume is sprayed from the fuel injector sequentially in time relative to the first spray plume. In some embodiments, the second spray plume is sprayed with a different spray angle than the first spray plume such that the second spray plume is at least partially physically spaced apart from the first spray plume. In some embodiments, the second plurality of fuel droplets has an average droplet size similar to the average droplet size of the first plurality of fuel droplets. In other embodiments, the second plurality of fuel droplets has an average droplet size dissimilar to the average droplet size of the first plurality of fuel droplets. The second plurality of fuel droplets can help to optimize the evaporation of the total amount of cryogenic fuel 51 during a compression cycle.

Figure 4:
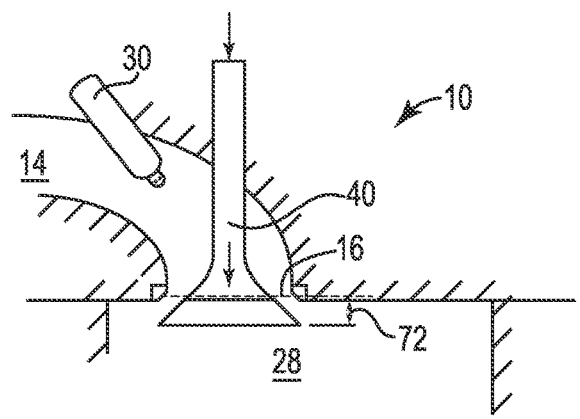
FIGS. 4-6 are sectional views of the combustion engine of FIG. 1 illustrating one embodiment of injection timing relative to the position of an intake valve.
Figure 5:
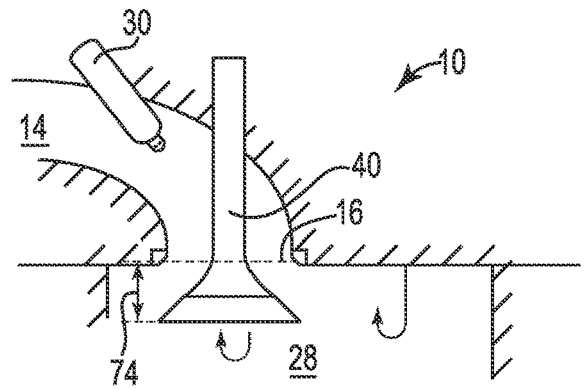
Figure 6:
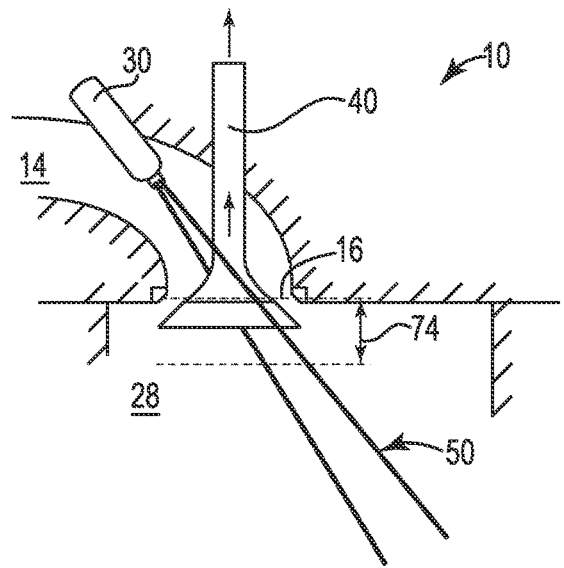

FIGS. 4-6 are partial elevation views of engine 10 illustrating, generally, valve lift and movement relative to an injection event. Direction of movement of valve stem 42 and valve head 44 is depicted by one or more arrows. FIG. 4 shows intake valve 40 opening. A lift distance 72 represents the amount of axial movement between valve header seat 16 and valve head 44. FIG. 5 shows intake valve 40 fully open, at the point in time at which valve stem 42 and valve head 44 begin to retract, represented by a lift distance 74. FIG. 6 shows intake valve 40 closing while fuel injector 30 sprays cryogenic fuel 51 into combustion chamber 28 in accordance with some embodiments set forth herein. Two spray plumes 50 are shown, which are sprayed concurrently at the given point in time and have different spray angles that are substantially parallel to the seat angle of valve head 44. In one embodiment, cryogenic fuel 51 is supplied to the combustion chamber by indirect injection only during the time the intake valve is between about 30% and 100% open.

As indicated above, the combustion engine is designed to cause evaporation of the cryogenic fuel in the combustion chamber. In some embodiments, the majority of the cryogenic fuel evaporates during the compression cycle of the combustion engine, optionally after the intake valve is closed and while the piston is moving toward the intake valve(s). Preferably, more than 80% of the cryogenic fuel evaporates within the closed combustion chamber before the piston reaches TDC at the end of the compression cycle. How long a droplet exists depends on its size and the temperature of its environment. Droplet size depends on injection pressure, which can be controlled by changing the pressure at the supply source and/or the injector orifice diameter. The temperature around the droplet depends on injection timing, fuel mass, charge gas mass, temperature and density, cylinder pressure, and cylinder temperature. In sum, there are a number of variables that can be controlled to affect evaporation, and their values can be determined empirically or by modeling.

As indicated above, the benefits of in-chamber evaporation include reduced cylinder temperature and pressure, as shown in FIGS. 2 and 3, which may result in increased torque, engine efficiency, and reduced NOx emissions. Therefore, by measuring exhaust temperature and NOx emissions, cylinder pressure, cylinder temperature, and torque under different injection (pressure and timing) conditions, or at least some of said variables, it is possible to determine whether more or less evaporation is taking place, thereby determining conditions to maximize the benefits of in-chamber evaporation. Further, by extrapolating a model developed with such information, it is possible to determine empirically the percentage of cryogenic fuel evaporated during the compression cycle, based on the pressure and temperature differences resulting from the liquid to gas transition. Such measurements may be performed with modules of the controller described above.

Figure 7:
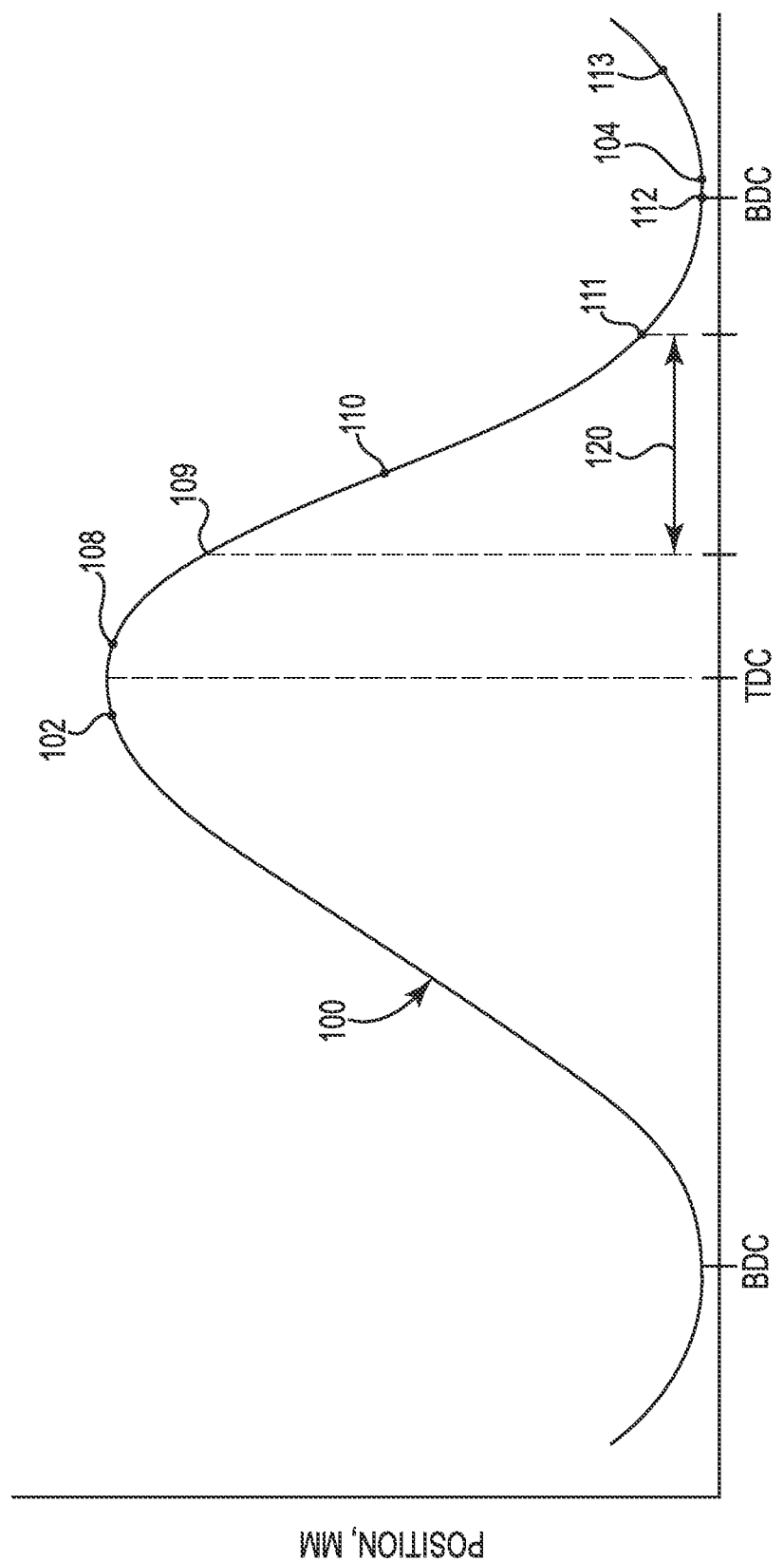
FIG. 7 is a graph depicting another embodiment of injection timing relative to the position of an intake valve and the position of a piston.
Figure 10:
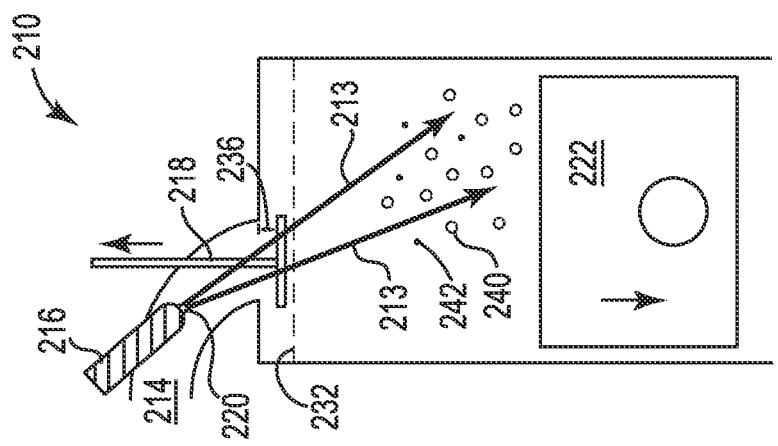
FIGS. 8-13 are sectional views of another embodiment of a combustion engine illustrating injection timing relative to the position of the intake valve and the position of the piston as depicted in FIG. 7.
Figure 9:
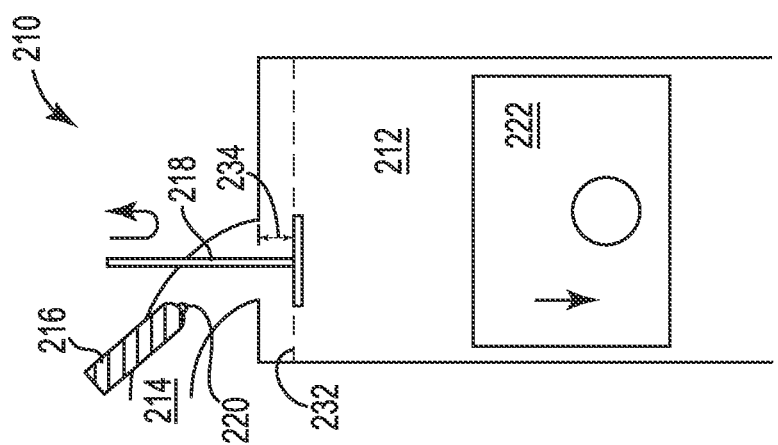
Figure 11:
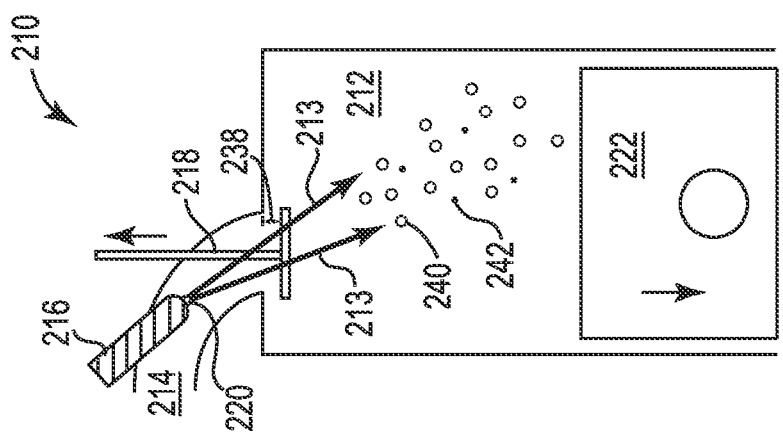
Figure 12:
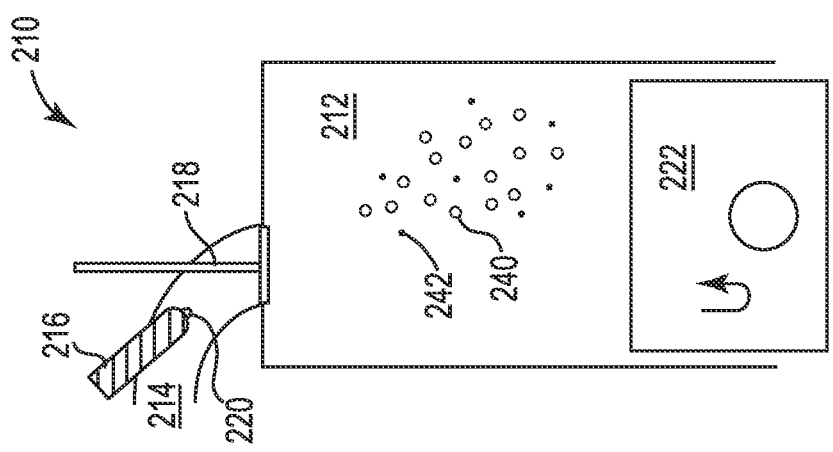
Figure 13:
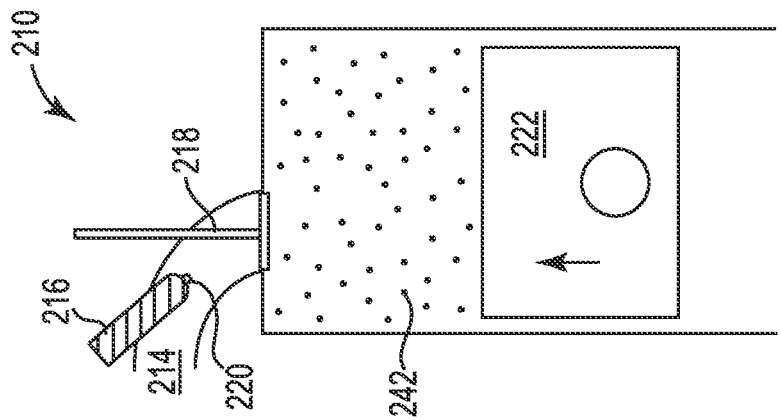

Another embodiment of combustion methodology will now be described with reference to FIGS. 7-13. FIG. 7 is a graph depicting another embodiment of injection timing relative to the position of the intake valve and the position of the piston. FIGS. 8-13 are sectional views of another embodiment of a combustion engine, denoted by numeral 210, illustrating injection timing relative to the position of an intake valve and the position of the piston as depicted in FIG. 7. The components of combustion engine 210 depicted in FIGS. 8-13 are substantially similar to corresponding components of engine 10, unless specifically noted otherwise. Referring to FIGS. 8-13, the combustion engine comprises a fuel injector 216 including an injector tip 220 configured for indirect injection through an intake port 214. An intake valve 218 enables entry of a charge gas through intake port 214 into a combustion chamber 212 during an intake cycle of the combustion engine, where a piston 222 moves axially to compress the mixture of the charge gas and the cryogenic fuel during a compression cycle of the combustion engine. In FIGS. 8-11, piston 222 is moving down while intake valve 218 opens (FIG. 8), stays open for some time (FIG. 9), and closes (FIGS. 10 and 11).

Figure 8:
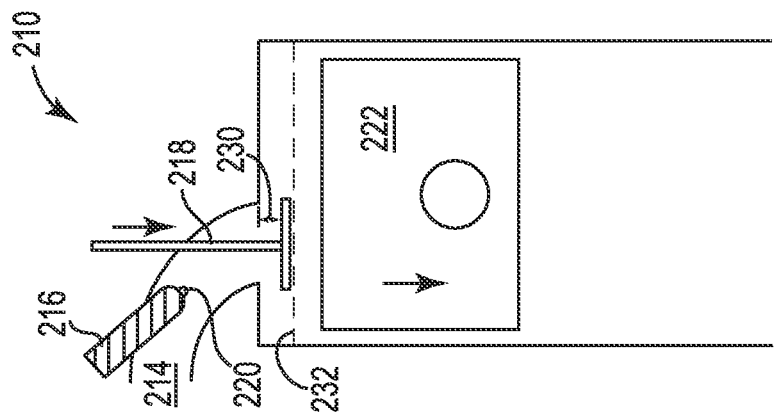

Referring to FIG. 7, the graph illustrates a line 100 representing the position of piston 222 relative to a crankshaft timing. The horizontal scale shows the BDC, TDC, and BDC positions of piston 222. The TDC to BDC time segment corresponds to the intake cycle. It should be understood that the description of the positions of the intake valves are relevant to indirect injection. While the same timing may be applied in direct injection, different injection may be applied since direct injection timing does not depend on the position of the intake valve. Point 102 on line 100 represents the time when the intake valve may begin to open, which may be just prior to TDC although it can also occur after TDC. Point 104 on line 100 represents the time when the intake valve may close, which may be just after to BDC although it can also occur just before BDC. Following point 102 the valve opens, as shown in FIG. 8, which corresponds to point 108 on line 100. The following time segment corresponds to an injection time window 120 during which injection can preferably occur. The duration of injection time window 120 is determined by the geometry of the combustion engine, including fuel injector and intake valve sizes, orientations, and proximity. In some embodiments, injection time window 120 extends between about 35 and 145 degrees from TDC during the intake cycle. In the present embodiment, the injection time window comprises about 100 degrees and begins at about 40 degrees from TDC. Point 109 on line 100 corresponds to FIG. 9, and illustrates when intake valve 218 reverses direction and, in the present embodiment, injection may begin.

Point 110 on line 100 corresponds to FIG. 10, which shows an injection event in progress, represented by spray plumes 213, fuel droplets 240, and fuel molecules 242, representing vaporized fuel droplets. It is expected that some fuel droplets 240 will vaporize during injection. However, by optimizing the geometry and operation of fuel injector 216, intake port 214, and intake valve 218, in some embodiments at least 90% of the mass of the cryogenic fuel will vaporize within combustion chamber 212. In other embodiments, at least 80% of the mass of the cryogenic fuel will vaporize within combustion chamber 212. Point 111 on line 100 corresponds to FIG. 11, which shows the end of the injection event shown in FIG. 10, evidenced by the reduced spray length. Point 112 on line 100 corresponds to FIG. 12, which shows the end of downward travel of piston 222 at BDC, at which time intake valve 218 is closed. Point 113 on line 100 corresponds to FIG. 13, which shows piston 222 moving up during the compression cycle, at which time all fuel doplets 240 have been vaporized, in accordance with embodiments set forth herein.

Cooling charge gas 15 after intake valve 218 closes may provide greater engine performance benefits when compared to cooling charge gas 15 before intake valve 218 closes by providing combustion engine 210 more effective temperature reduction and thermodynamic benefits that are similar to a Miller cycle. Also, cooling of charge air 15 takes place, in some embodiments, as early in the compression cycle as possible in order to maximize benefits of polytropic compression. As such, as shown in FIG. 6, cryogenic fuel 213 is sprayed into combustion chamber 212 while intake valve 218 is closing. In other embodiments, cryogenic fuel 213 is sprayed into combustion chamber 212 as intake valve 218 opens, thereby increasing the injection time window. A wider window may be desirable to effectuate multiple injections during one intake cycle, for example. In some embodiments, cryogenic fuel 213 is sprayed as piston 222 moves from TDC to BDC.

Fuel injector 216 may spray cryogenic fuel to achieve particular engine performance-affecting results. For example, in some embodiments fuel injector 216 may spray cryogenic fuel 213 such that cryogenic fuel 213 has minimal heat gain prior to entering combustion chamber 212. Fuel injector 216 is optionally adapted to deliver cryogenic fuel 213 into combustion chamber 212 with a targeted spray profile that minimizes fuel impingement with intake port 214 and combustion chamber surfaces.

Having described above the structure and operation of embodiments of the invention in detail, additional exemplary embodiments will now be described:

EXAMPLE 1

A combustion engine for delivering a cryogenic fuel into a combustion chamber, the combustion engine comprising: a combustion chamber; an intake port adapted to receive air from an air source and having an outlet in fluid connection with the combustion chamber; a fuel injector having a nozzle adapted to spray a cryogenic fuel into the combustion chamber such that the cryogenic fuel has minimal heat gain prior to entering the combustion chamber; and an intake valve engaging with the outlet of the intake port, the intake valve being adapted to deliver the air and the cryogenic fuel to the combustion chamber in an open configuration, the intake valve being further adapted to seal the air with the cryogenic fuel within the combustion chamber in a closed configuration such that the air cools during a power cylinder compression cycle.

EXAMPLE 2

The combustion engine of example 1, wherein the fuel injector is disposed within the intake port adjacent to the outlet of the intake port.

EXAMPLE 3

The combustion engine of example 2, wherein the fuel injector is disposed within the intake port and the nozzle is adapted to spray the cryogenic fuel in a direction towards the outlet of the intake port.

EXAMPLE 4

The combustion engine of example 2, wherein the fuel injector is disposed within the intake port at an oblique angle relative to a longitudinal axis of the intake port.

EXAMPLE 5

The combustion engine of example 2, wherein the fuel injector is disposed within the intake port at an oblique angle relative to a longitudinal axis of the intake valve.

EXAMPLE 6

The combustion engine of example 1, wherein the nozzle is adapted to deliver the cryogenic fuel into the combustion chamber with a targeted spray profile;

EXAMPLE 7

The combustion engine of example 6, wherein the nozzle is adapted to deliver the cryogenic fuel into the combustion chamber with the targeted spray profile that minimizes fuel impingement with walls of the intake port.

EXAMPLE 8

The combustion engine of example 1, wherein the fuel injector is coupled directly to an interior of the combustion chamber and is adapted to spray the cryogenic fuel directly into the combustion chamber.

EXAMPLE 9

The combustion engine of example 1, wherein the cryogenic fuel is liquid natural gas.

EXAMPLE 10

The combustion engine of example 1, wherein the cryogenic fuel is hydrogen.

EXAMPLE 11

A method of delivering a cryogenic fuel into a combustion chamber in an engine, the method comprising: delivering air from an intake port by actuating an intake valve into an open configuration such that the air flows from an inlet of the intake port to an outlet of the intake port, the outlet connecting the intake port to the combustion chamber of an engine; spraying a cryogenic fuel using a fuel injector that includes a nozzle, the fuel injector being disposed within the intake port and spraying the cryogenic fuel from the nozzle in a direction towards the outlet such that the cryogenic fuel enters the combustion chamber without impinging walls of the combustion chamber and minimizes heating of the cryogenic fuel before the cryogenic fuel enters the combustion chamber; and sealing the combustion chamber by actuating the intake valve into a closed configuration such that the cryogenic fuel cools the air within a sealed combustion chamber during a compression cycle.

EXAMPLE 12

The method of example 11, wherein the spraying the cryogenic fuel occurs as a piston of the combustion chamber moves from a top dead center position to a bottom dead center position.

EXAMPLE 13

The method of example 11, wherein the spraying the cryogenic fuel from the nozzle occurs within the intake port at a location proximate to the combustion chamber such that the cryogenic fuel has minimal heat gain prior to entering the combustion chamber.

EXAMPLE 14

The method of example 11, wherein the spraying of the cryogenic fuel towards the outlet produces a first spray plume of the cryogenic fuel within the combustion chamber.

EXAMPLE 15

The method of example 13, wherein the first spray plume of the cryogenic fuel is delivered to the combustion chamber with minimal fuel impingement of an inner liner of the combustion chamber.

EXAMPLE 16

The method of example 13, wherein the spraying the cryogenic fuel produces the first spray plume that includes a plurality of droplets, wherein the plurality of droplets has an average droplet size to facilitate optimal evaporation of the cryogenic fuel, such that evaporation occurs after the intake valve closes and before the piston moves into a top dead center position.

EXAMPLE 17

The method of example 11, wherein the spraying of the cryogenic fuel towards the outlet produces a second spray plume of the cryogenic fuel that enters the combustion chamber.

EXAMPLE 18

The method of example 11, wherein the timing of the sealing of the combustion chamber facilitates cooling of the air within the combustion chamber such that the engine produces minimal amounts of NOx.

EXAMPLE 19

The method of example 11, wherein the timing of the sealing of the combustion chamber facilitates cooling of the air by mechanisms of latent heat of vaporization and specific heat of the cryogenic fuel.

EXAMPLE 20

The method of example 11, wherein the timing of the sealing of the combustion chamber facilitates cooling the air by the cryogenic fuel at a constant volume.

EXAMPLE 21

The method of example 11, wherein the spraying the cryogenic fuel includes using the fuel injector to spray natural gas.

EXAMPLE 22

The method of example 11, wherein the spraying the cryogenic fuel includes using the fuel injector to spray hydrogen gas.

It should be understood that the present invention is applicable to all internal combustion engines utilizing a fuel injection system. For example, internal combustion engines including a fuel injector in accordance with the present invention can be used in all industrial and transportation fields, and commercial and non-commercial applications, including locomotives, trucks, passenger cars, and generators, and other industrial equipment. Further, it should be understood that the combustion engines described above may comprise any number of cylinders, and more than one intake valve per cylinder.

Various modifications and additions can be made to the exemplary embodiments discussed without departing from the scope of the present invention. For example, while the embodiments described above refer to particular features, the scope of this invention also includes embodiments having different combinations of features and embodiments that do not include all of the above described features.

What is claimed is:

1. A combustion engine for combusting cryogenic fuel, the combustion engine comprising:
   a block having a cylindrical bore;
   a valve header having an intake port structured to receive a charge gas and guide the charge gas to a combustion chamber through a valve throat of the valve header;
   a piston structured to move axially within the cylindrical bore toward the valve header in a compression cycle of the combustion engine, the piston, the cylindrical bore, and the valve header forming the combustion chamber;
   an exhaust valve;
   an intake valve fluidly connecting the intake port with the combustion chamber, wherein closing the intake valve and the exhaust valve closes the combustion chamber, wherein the intake valve comprises a valve head seat and the intake valve is closed when the valve head seat mates with the valve throat;
   a fuel injector positioned to discharge the cryogenic fuel in a liquid state into the intake port and through the intake valve, the fuel injector having an injector tip; and
   a controller configured to
      determine a position of the intake valve; and
      actuate the fuel injector in relation to the position of the intake valve to discharge the cryogenic fuel in the liquid state through the injector tip into the intake port and through the intake valve and thereby form a spray plume of the cryogenic fuel in the combustion chamber without the spray plume impinging on a cylindrical surface of the combustion chamber, such that the combustion engine evaporates at least 60% of the cryogenic fuel in the closed combustion chamber during the compression cycle.

2. The combustion engine of claim 1, wherein the combustion engine is capable of evaporating in the closed combustion chamber at least 80% of the cryogenic fuel discharged by the fuel injector in a given cycle.

3. The combustion engine of claim 1, wherein the controller is structured to cause the fuel injector to discharge the cryogenic fuel after the intake valve reaches a full-open position.

4. The combustion engine of claim 1, wherein the intake valve includes a valve throat supported by the valve header and having a valve throat diameter, and a valve head structured to mate with the valve throat to close the combustion chamber, wherein the fuel injector includes a fuel injector tip through which the cryogenic fuel is discharged to the intake port, the fuel injector tip positioned between 0.5 and 3.0 valve throat diameters from the valve throat measured perpendicularly to a plane parallel to the open area of the valve throat.

5. The combustion engine of claim 4, wherein the fuel injector tip is disposed within less than 2.0 valve throat diameters from the valve throat.

6. The combustion engine of claim 5, wherein the fuel injector tip is disposed no more than 1.0 valve throat diameters from the valve throat.

7. The combustion engine of claim 1, wherein the intake valve includes a valve throat and a valve head structured to mate with the valve throat to close the combustion chamber, wherein the valve head has a seat angle and the fuel injector is structured and mounted on the valve header to discharge a spray plume at an angle parallel to the seat angle.

8. The combustion engine of claim 1, wherein the controller is structured to cause the fuel injector to begin discharging the cryogenic fuel while the intake valve is still closed.

9. A method of operating a combustion engine, the method comprising:
supplying a charge gas to a combustion chamber through an intake port and a valve throat;
discharging a cryogenic fuel in a liquid state from an injector tip of a fuel injector through the intake port and an intake valve into the combustion chamber thereby forming a spray plume of the cryogenic fuel in the combustion chamber without the spray plume impinging on a cylindrical surface of the combustion chamber;
closing the intake valve and an exhaust valve to close the combustion chamber, wherein the intake valve comprises a valve head seat and the intake valve is closed when the valve head seat mates with the valve throat; and
actuating a piston during a compression cycle to compress the charge gas and evaporate at least 60% of the cryogenic fuel in the closed combustion chamber.

10. The method of claim 9, wherein the at least a portion of the cryogenic fuel that evaporates in the closed combustion chamber comprises at least 80% of the cryogenic fuel discharged by the fuel injector in a given cycle.

11. The method of claim 9, wherein discharging a cryogenic fuel in a liquid state includes opening the intake valve, and discharging the cryogenic fuel after the intake valve reaches a full-open position.

12. The method of claim 9, wherein the intake valve includes a valve throat supported by a valve header and having a valve throat diameter, wherein discharging a cryogenic fuel in a liquid state includes discharging the cryogenic fuel from a distance to the valve throat of between 0.5 and 3.0 valve throat diameters measured perpendicularly to a plane parallel to the open area of the valve throat.

13. The method of claim 12, wherein discharging a cryogenic fuel in a liquid state includes discharging the cryogenic fuel from a distance to the valve throat of less than 2.0 valve throat diameters.

14. The method of claim 13, wherein discharging a cryogenic fuel in a liquid state includes discharging the cryogenic fuel from a distance to the valve throat of no more than 1.0valve throat diameters.

15. The method of claim 9, wherein discharging a cryogenic fuel in a liquid state includes discharging a spray plume of the cryogenic fuel at an angle parallel to a seat angle of a valve head of the intake valve.

* * * * *